(12) United States Patent
Colens

(10) Patent No.: US 6,321,515 B1
(45) Date of Patent: Nov. 27, 2001

(54) SELF-PROPELLED LAWN MOWER

(76) Inventor: André Colens, rue du Baillois 5, Rixensart (BE), B-1330

( * ) Notice: Subject to any disclaimer, the term of this patent is extended or adjusted under 35 U.S.C. 154(b) by 0 days.

(21) Appl. No.: 09/381,206
(22) PCT Filed: Mar. 18, 1998
(86) PCT No.: PCT/BE98/00038
 § 371 Date: Sep. 17, 1999
 § 102(e) Date: Sep. 17, 1999
(87) PCT Pub. No.: WO98/41081
 PCT Pub. Date: Sep. 24, 1998

(30) Foreign Application Priority Data

Mar. 18, 1997 (BE) ................................................. 9700237

(51) Int. Cl.[7] ................................................. A01D 75/00
(52) U.S. Cl. ..................................... 56/10.2 A; 56/DIG. 7
(58) Field of Search ........................... 56/10.2 A, 10.2 F, 56/DIG. 7; 180/167, 168, 169; 701/300, 207, 23

(56) References Cited

U.S. PATENT DOCUMENTS

| 4,133,404 | * | 1/1979 | Griffin | 180/79.1 |
| 4,533,998 | * | 8/1985 | Falamak | 180/168 |
| 4,558,760 | * | 12/1985 | Lestrader | 180/169 |
| 4,831,813 | * | 5/1989 | Jonas et al. | 56/10.2 A |
| 4,947,324 | * | 8/1990 | Kamimura et al. | 180/169 |
| 4,994,970 | * | 2/1991 | Noji et al. | 56/10.2 A |
| 5,007,234 | * | 4/1991 | Shurman et al. | 56/10.2 R |
| 5,083,629 | * | 1/1992 | Chang | 180/168 |

* cited by examiner

Primary Examiner—Thomas B. Will
Assistant Examiner—Meredith C. Petravick
(74) Attorney, Agent, or Firm—Pillsbury Winthrop LLP

(57) ABSTRACT

The invention concerns a self-propelled lawn mower and a method adapted for using said machine. The machine comprises: a mobile frame (1) including at least one drive wheel (6) and at its lower surface at least two juxtaposed cutters (3), associated each with an electric motor; an electronic system for controlling the forward movement of the machine; an on-board computer; an electric power supply; means for measuring the force supplied by each cutter, said measurement being transmitted to the on-board computer; a memorized algorithm for seeking the grass surfaces to be mowed by the interaction of the machine forward movement system, said force measurements and the on-board computer; means for detecting the limits of the surface to be mowed by a magnetic field measurement or the variation of a magnetic field emitted or caused by a set or buried wire, located at said limits.

32 Claims, 2 Drawing Sheets

SELF-PROPELLED LAWN MOWER

This application is the national phase of international application PCT/BE98/00038 filed Mar. 18, 1998 which designated the U.S.

This invention relates to improvements to an autonomous lawn mower, more especially a multiple-cutting-head autonomous lawn mower.

The European patent EP-A-0 550 473 puts forward a low-power robotic mower traveling almost continuously over the surface to be mowed in random manner.

From the same above mentioned patent, a first improvement is known with respect to a purely random system by utilizing the measurement of the energy absorbed by the cutting head in order to determine whether or not the machine is in an already mown area. This enables the mower at one and the same time to adjust its progression speed in order to remain only a short time in an already mown area and on the other hand to modify its behavior when passing over a non-mown area (e.g. then to follow a spiral mowing path).

This invention puts forward additional improvements for the mowing efficiency of a robotic mower, in particular for mowing large surface areas, for example for golf courses or park surface areas.

One of the disadvantages associated with mowing devices designed for large surface areas such as utilized at present, consists in the utilization of a relatively powerful cutting system, the surface of the cutting head or heads having to be greater than for classic mowers for domestic use. The inertia of the cutting disk(s) or blade(s) is also greater. The safety in use of these devices therefore presents a problem, especially if a foreign body accidentally comes into contact with the cutting head(s). This safety problem also arises, and even more so, when robotic mowing devices are to be utilized for large surface areas.

According to a first aspect of the invention, a robotic mower is put forward which does not have or greatly reduces this inconvenience.

According to a second aspect of the invention, a guiding method for a robotic mower is put forward, more especially adapted to the robotic mower according to the invention.

Fundamentally two basic techniques exist for defining the route of a mobile autonomous robot, e.g. a robot for lawn mowing:
- a systematic mowing technique by which the mower systematically mows the lawn, as a human being does with a classic mower, either by following a predetermined route, for example by concealing a guiding wire in the ground, or by utilizing a mapping and/or position finding system by means of markers;
- a random route technique by which the robotic mower moves constantly in random manner on the surface area to be mowed without searching for a determined route.

The advantage of the latter technique is that it can be made naturally self-adapting which gives the system a very great strength. Its necessitates on the other hand a great number of passes in order to obtain a complete coverage of the surface area (3 passes guaranteeing 97% coverage). This hardly poses any problem in the case of a continuous technique (see European patent 0 550 473 relating to a possibly solar-powered robotic mower), but constitutes a handicap if a lawn is to be mowed occasionally and quickly with a robotic mower without predetermined guiding system.

All the elements mentioned but not described in detail in this specification are analogous or identical to those described in the above mentioned European patent 0 550 473, incorporated by reference into this specification.

According to a first aspect of the invention a robotic mowing device with several cutting heads is put forward.

More especially the mowing device has the following elements, taken separately or in any combination:
- a mobile chassis comprising at least one driving wheel and on its lower side at least two juxtaposed cutting heads, preferably each connected to a preferably electric, independent motor
- an electronic control system
- an on-board computer
- an electric power supply unit
- a means for measuring the force provided by each cutting head, the aforesaid measurement being transmitted to the on-board computer
- an algorithm stored in memory enabling the interaction of the advancement system of the device, the above mentioned force measurements and the on-board computer, means capable of enabling for example the searching for surface areas of grass to be cut;
- a means for detecting the boundaries of the mowing surface area by measurement of a magnetic field or of the variation of a magnetic field emitted or caused by a laid-down or buried wire located at the aforesaid boundaries, and possibly
- a means for detecting obstacles by analysis of relative movements of an upper plate of the device elastically integral to its chassis such as described in the European patent EP 0 550 473
- an anti-theft device based on the measurement of the movement away from the ground and/or on a code peculiar to the user.

According to a first aspect of the invention the adoption of a machine with several cutting heads, preferably identical, is therefore provided. Thus two, three, four, five or more than five cutting heads can be provided, e.g. eight cutting heads, installed on one and the same mower chassis. According to an embodiment concretized at present, five cutting heads are provided. The cutting heads are preferably situated at the front of the chassis, which can measure e.g. from 60 cm to 2 m in width, their locations being at least offset one in relation to the other over the width of the chassis (direction perpendicular to movement). The power associated with each cutting head is generally situated between 10 and 90 watts, preferably between 15 and 60 watts, more preferentially between 20 and 50 watts. By way of example, the diameter of a cutting head can vary from 10 to 50 cm, a diameter of approximately 20 cm having proved advantageous.

The robotic mower with several cutting heads consists of a chassis driven by two driving wheels, similar to that described in the above mentioned European patent 0 550 473. The driving wheels will nevertheless advantageously have a considerably larger diameter, e.g. from 2 to 4 times greater, than the other wheels. At the front of the machine several independent cutting heads are mounted. According to an embodiment preferred at present each of the cutting heads is operated by its own electric motor.

These cutting heads are preferably flexibly mounted so that the ground irregularities can lift each cutting head independently. When such lifting occurs, the cutting power of the corresponding head could momentarily no longer be taken into account by the computer (parameter decoupling).

The cutting heads can be of the type described in the patent application PCT WO 96/242432.

The motors of each head can be independently operated and the measurement of the torque of each motor is transmitted to the on-board computer.

According to an embodiment of the invention, the cutting force of each head is constantly analyzed (e.g. several hundred times per second), in known manner, by the computer of the mower. When the machine partially overlaps a mown area and an unmown area, the result of the analysis of the forces on each cutting head enables the computer to situate the machine in relation to the boundary of the two areas and to position itself in consequence.

The on-board computer can thus control the route of the mower in order to make it approximately follow the demarcation between the two areas, resulting for example from the trace left by a previous pass of the robotic mower.

In order to mow a determined surface area, the device can be placed and actuated in any location of this surface area. The route can first be effected randomly until the computer detects a mown area/unmown area demarcation and actuates the above mentioned algorithm. The normal progression speed of the device can vary but is advantageously of approximately 1 m/sec (e.g. 2 to 5 km/h).

Alternatively, when the perimeter of the area to be mowed is defined by a wire, in which for example a low-frequency current flows such as described in the above mentioned patent EP-A-0 550 473, the above mentioned guiding technique based on the aforementioned demarcation can be combined with a technique linked to a systematic starting of the mowing process along the peripheral wire as described hereafter. According to another aspect of the invention, each technique can moreover also be utilized independently.

According to this second technique, at the start of mowing the machine (with one or several cutting heads) is positioned along the peripheral wire. After starting, the on-board computer periodically, in known manner, measures the amplitude of the signal emitted by the peripheral wire. This measurement enables the on-board computer to know the distance separating it from the wire and therefore to control the direction of the machine in order to keep it at a fixed distance from the wire.

If the length of the wire has previously been stored in the memory of the on-board computer, this can determine with a reasonable precision the time when a complete round has been effected by the mower along this wire. The mower can then move away from the wire by a distance equal to the cutting width in order to be able to effect a new circuit at a distance from the wire increased by the cutting width. The operation can thus be repeated by each time increasing the distance between the mower and the peripheral wire, ideally until arriving at the center of the area to be mowed.

According to a variant of the embodiment, it is not necessary to store the length of the above mentioned wire in the computer. The length can indeed be determined by the on-board computer by integrating the differences in speed between the driving wheels of the machine (changes of direction), until the cumulated change reaches or exceeds 360°. To this end, the system can also advantageously integrate a magnetic or inertial compass.

It should be understood that this method according to the invention, based on a wire located at the boundaries of the surface area to be mowed can be applied to all autonomous robotic mowers, including those which only have one single cutting head.

Nevertheless, in certain circumstances, this method based on a wire located at the boundaries of the surface area to be mowed has two limitations:

the farther the machine moves away from the wire, the more the signal decreases and the more difficult it is to obtain a precise positioning in relation to this wire, moreover, the magnetic field variation is not uniform at all points of the route, it is faster for example in the angles.

It is possible therefore advantageously to resort to a combination of the two above mentioned techniques: when the positioning precision becomes insufficient, the multiple-head robotic mower according to the invention can adjust its path, due to the analysis of the different cutting forces of the cutting heads.

Finally, having arrived at a central portion of the ground, where the signal from the wire is very weak and the gradient practically zero, the robotic mower can therefore only operate, if it has several heads, on a mode based on the analysis of the cutting forces of each head, and/or based on a random path if no precise "mown area/unmown area" boundary is detected. This latter possibility can be applied for a mower with one single cutting head.

Alternatively, in this central portion, the robotic mower, with one or several heads, can adopt a systematic mowing system, e.g. either in spiral (see patent EP 550473) or in back and forth mowing.

This latter variant consists in a back and forth movement of the mower, the mower moving in a straight line, possibly guided by means of data from a compass, until the signal from the peripheral wire is greater than a reference value, in which case the mower turns back with a displacement of its track of one cutting width in order thus to approach the other extremity of the weak signal area and again to turn back with displacement, e.g. with a displacement corresponding to or less than a cutting width.

The mower according to the invention can be powered by one or more rechargeable batteries, the recharging being effected according to known techniques for example by providing in the movement algorithm, a periodic return of the device to a, preferably induction, recharging station, such as described in the European patent 0 744 093.

According to another aspect of the invention, in the robotic mower, a source of energy can be provided consisting of a heat engine generator, operating with a classic fuel, of low power driving the robotic unit through a regulator. Preferably the generator is the low-voltage three-phase type, running at a stable speed but higher than that of traditional generating sets and driving the system via a bridge rectifier. This type of generator is commercially available for example for camping or installation in sailboats.

By way of example, the engine can be a 2-stroke one of 35 $cm^3$ driving a three-phase generator. The engine can run at 3000 or 4500 revolutions per minute thus generating up to 200 or 450 watts respectively. The thermal generator can thus be derived from a Honda EX 500 generator provided with a GE 35 engine, the unit being modified by connecting a 24 V 10 A regulator.

This technique enables the implementation of a very compact and light unit, which produces electricity flexibly, with an autonomy greater than that possible by utilizing a rechargeable battery. It should be understood that according to an aspect of the invention, a similar type of power supply can be adapted to all mobile autonomous robots.

According to yet another aspect of the invention, the mower can be provided with a rechargeable battery connected to the above mentioned thermal generator whether or not suited for supplying electric power direct or through the rechargeable battery which is connected thereto.

According to still another aspect of the invention, the mower can be provided with an ultrasonic detector, of the sonar type, from which the data are transmitted to the on-board computer in order to enable the device to slow down when approaching an obstacle. The obstacle itself being detected by the relative movement of a plate and of the chassis as already described.

Figure 1:
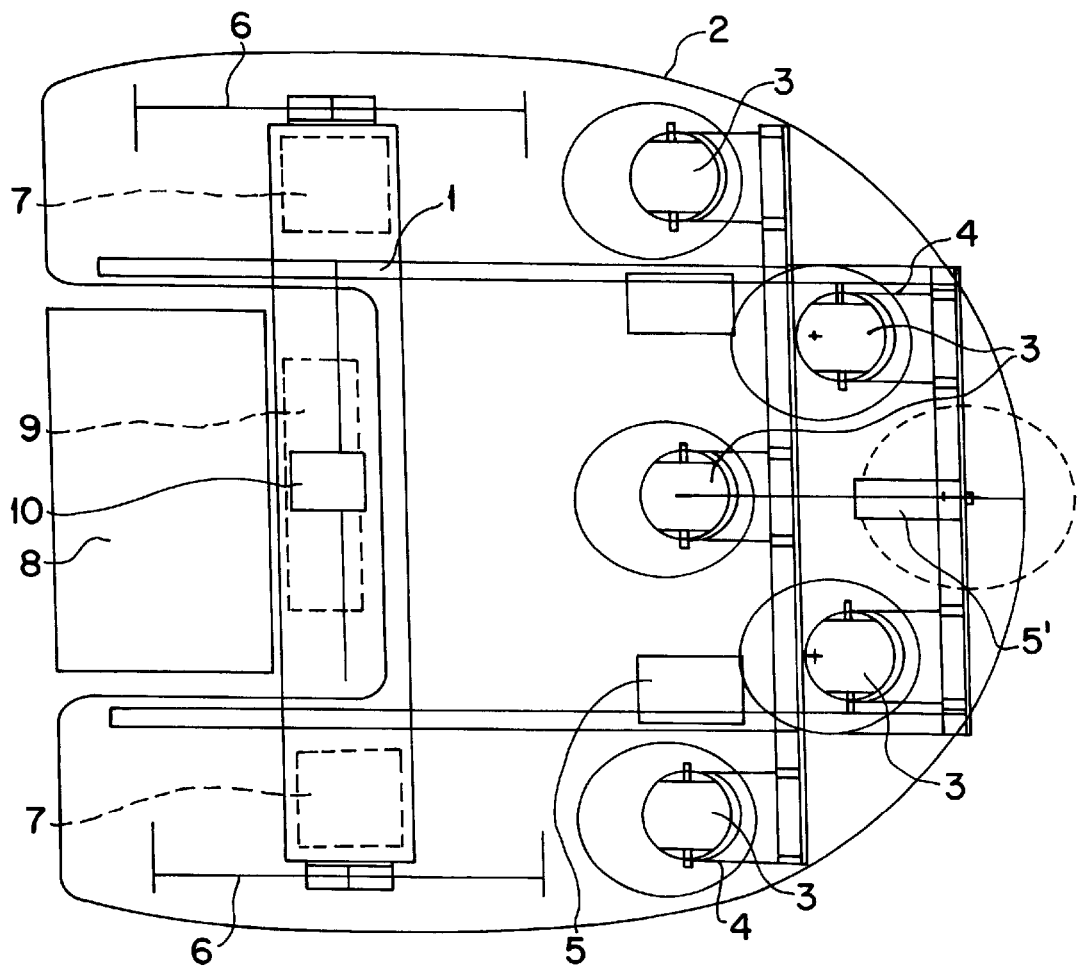
FIG. 1 is a schematic top view of an embodiment of a lawn mower according to the invention.
Figure 2:
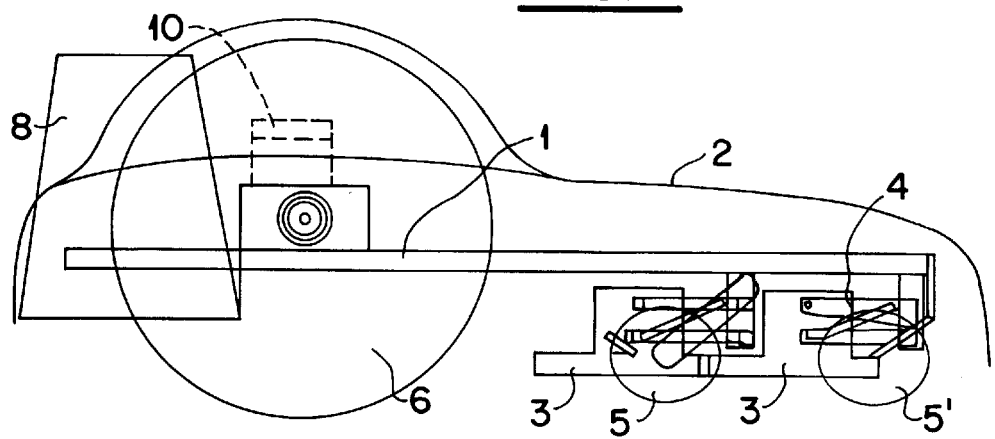
FIG. 2 is a schematic elevation view of the mower from FIG. 1.

In FIG. 1 a beam chassis 1 can be seen, covered by a hood 2, e.g. in polycarbonate or polyester. The beam chassis is mechanically connected at the front to five identical cutting heads 3 situated on two lines and offset in relation to the perpendicular to the direction of movement, so as to be able to cover a substantial part of the width of the mower. Three free wheels 5 can be discerned situated in triangle at the front, the foremost free wheel 5' being a loose wheel. Flexible attachment means 4 for the heads, and two driving wheels 6 driven by electric motors 7 can also be discerned. These driving wheels will generally advantageously be of large diameter in order to avoid all jarring of the chassis in movement. The generator is located in 8, the computer in 9 and the optional ultrasonic detector in 10. The device has a width of the order e.g. of 1 meter.

Figure 3:
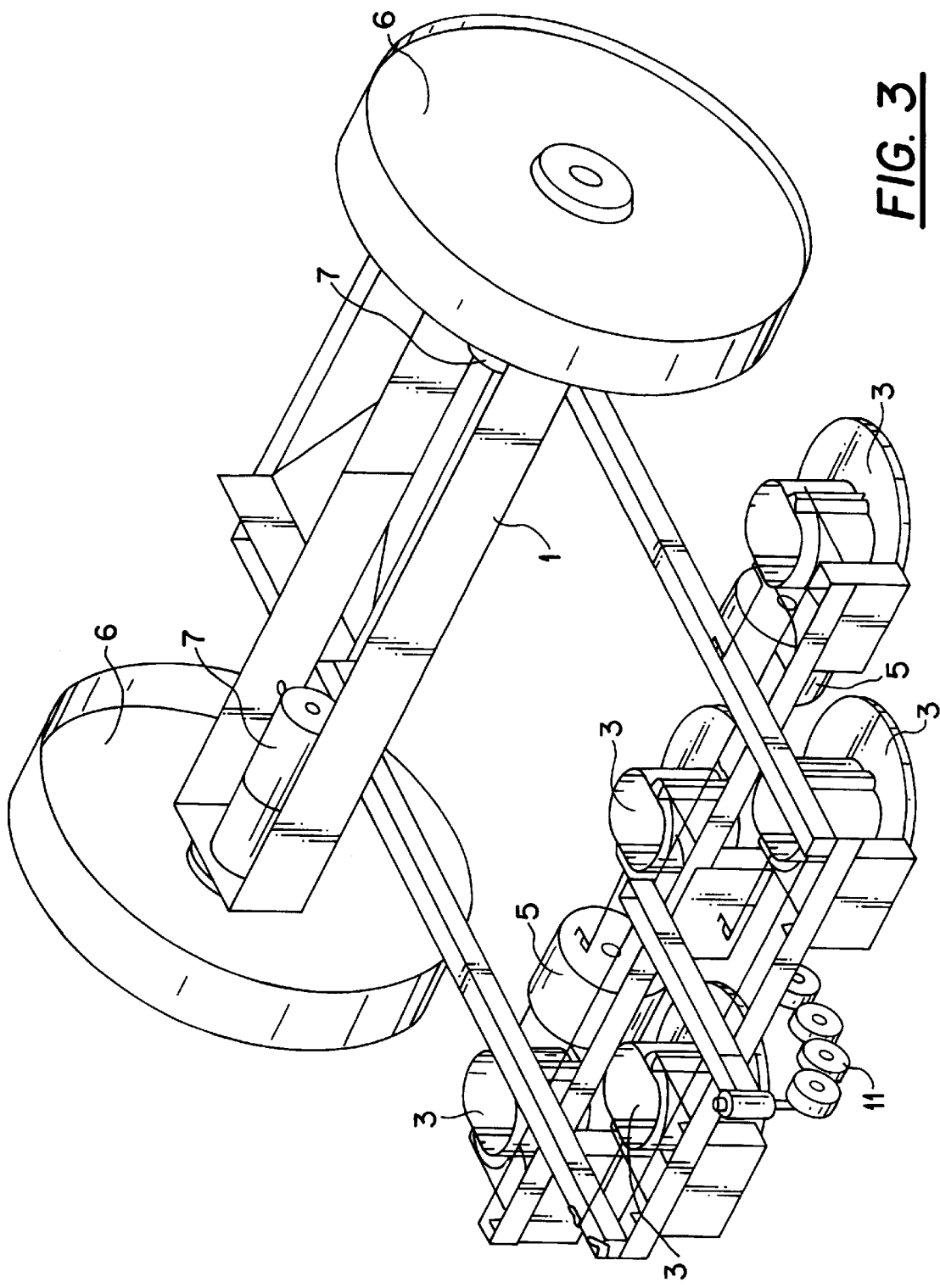
FIG. 3 is a view in perspective of the mechanical part of another robotic mower according to the invention.

In FIG. 3 most of the above mentioned elements can be discerned. The plate 2 is not represented. The loose wheel from FIG. 1 has been replaced by an element in arc of circle capable of pivoting like a loose wheel, arc of radius greater and bearing a set of wheels 11. This configuration has proved to be advantageous for avoiding too great a jolting of the unit. The two other free wheels 5 are in the form of short rollers.

What is claimed is:

1. An operating method for a robotic lawn mower which comprises:

positioning the mower along a wire delimiting the periphery of the surface area to be mowed, periodically receiving with an on-board computer the measurement of the amplitude of a signal emitted by the peripheral wire, sending commands by the computer to a control system in order to make the mower advance at a constant distance from the aforesaid peripheral wire, evaluating by the computer on the basis of the measurement of the distance the time when a complete round has been effected by the mower along the wire, and controlling through the computer a positioning of the mower at a distance from the aforesaid wire greater than the previous one, the difference being equal too or less than the cutting width.

2. A method according to claim 1 wherein, when the signal emitted by the wire is of an intensity of less than a reference value, the computer applies an algorithm based on a random path.

3. A method according to claim 1 wherein, when the signal emitted by the wire is of an intensity of less than a reference value, the computer applies an algorithm based on a spiral.

4. A method according to claim 1 wherein, when the signal emitted by the wire is of an intensity of less than a reference value, the computer applies an algorithm based on a back and forth systematic mowing, the change of direction being controlled by the level of the signal emitted by the aforesaid wire.

5. A method according to claim 1 wherein the computer evaluates on the basis of the measurement of the distance combined with a measurement of the changes of direction.

6. Robotic mowing device comprising an on-board computer able to act on an electronic advancement control system said computer being programmed for applying the process of claims 1.

7. Robotic mowing device according to claim 6 characterised in that it comprises at least two cutting heads.

8. Robotic mowing device according to claim 7 characterised in that the two cutting heads are each driven by an independent motor.

9. Device according to claim 7 comprising furthermore a means for measuring the force provided by each cutting head, the aforesaid measurement being transmitted independently to the on-board computer able to act on the electronic advancement control system.

10. Device according to claim 6 further characterised in that it is programmed for applying a mowing process—when the signal emitted by the wire is of an intensity of less than a reference value—based on a random path combined with the measurements of the force registered in at least two cutting heads.

11. Device according to claim 6 wherein the motors are electrical motors.

12. Device according to claim 6 comprising a means for detecting obstacles by relative movement of a plate flexibly mounted on said device.

13. Device according to claim 6 comprising a means for measuring a magnetic field or the variation of a magnetic field emitted or caused by a laid-down or buried wire located at the aforesaid boundaries.

14. Device according to claim 6 including an electric power supply unit which comprises a heat engine generator.

15. Device according to claim 7 wherein the driving wheels have a diameter from 2 to 4 times greater than the other wheels.

16. Device according to claim 6 integrating a magnetic or inertial compass.

17. Device according to claim 6 wherein the cutting heads are flexibly mounted so that ground irregularities can lift each cutting head independently.

18. An operating method for an on-board computer in a robotic lawnmower comprising the steps of:

receiving periodically a measurement of the amplitude of a signal emitted by a peripheral wire, sending commands to a control system within said robotic lawnmower in order to make the mower advance at a constant distance from the aforesaid peripheral wire, the lawn being then cut on a defined width, evaluating, on the basis of the measurement of the distance, the time when a complete round has been effected by the mower along the wire, then controlling a positioning of the mower at a distance from the aforesaid wire greater than the previous one.

19. An operating method according to claim 18 wherein the difference in the distance from the wire is equal to or less than the said cutting width.

20. An operating method according to claim 18 wherein the time when a complete round has been effected is also evaluated on the basis of a measurement of the changes of direction.

21. A method according to claim 18 wherein, when the signal emitted by the wire is of an intensity of less than a reference value, the computer applies an algorithm based on a random path.

22. A method according to claim 18 wherein, when the signal emitted by the wire is of an intensity of less than a reference value, the computer applies an algorithm based on a spiral.

23. A method according to claim 18 wherein, when the signal emitted by the wire is of an intensity of less than a reference value, the computer applies an algorithm based on a back and forth systematic mowing, the change of direction being controlled by the level of the signal emitted by the aforesaid wire.

24. A method according to claim 18 wherein the robotic lawnmower has two cutting heads each driven by an independent motor and comprises a means for measuring the force provided by each cutting head, the aforesaid measurement being transmitted independently to the on-board computer and being the basis to operate the electronic advancement control system when the signal emitted by the wire is of an intensity of less than a reference value.

25. A method according to claim 18 wherein the lawnmower further comprises a magnetic or inertial compass.

26. An operating method for an on-board computer in a robotic lawnmower comprising the steps of:

receiving periodically the measurement of the amplitude of a signal emitted by the peripheral wire, sending commands to a control system in order to make the mower advance at a constant distance from the aforesaid peripheral wire, the lawn being then cut on a defined width, evaluating, on the basis of the measurement of the change of direction, the time when a complete round has been effected by the mower along the wire, then controlling a positioning of the mower at a distance from the aforesaid wire greater than the previous one.

27. A method according to claim 26 wherein, when the signal emitted by the wire is of an intensity of less than a reference value, the computer applies an algorithm based on a random path.

28. A method according to claim 26 wherein, when the signal emitted by the wire is of an intensity of less than a reference value, the computer applies an algorithm based on a spiral.

29. A method according to claim 26 wherein, when the signal emitted by the wire is of an intensity of less than a reference value, the computer applies an algorithm based on a back and forth systematic mowing, the change of direction being controlled by the level of the signal emitted by the aforesaid wire.

30. A method according to claim 26 wherein the robotic lawnmower has two cutting heads each driven by an independent motor and comprises a means for measuring the force provided by each cutting head, the aforesaid measurement being transmitted independently to the on-board computer and being the basis to operate the electronic advancement control system when the signal emitted by the wire is of an intensity of less than a reference value.

31. A method according to claim 26 wherein the measurement of the change of direction is performed by integrating the differences in speed between driving wheels operating the lawnmower.

32. An operating method according to claim 26 wherein the difference in the distances from the wire is equal to or less than the said cutting width.

* * * * *